R. B. WILLIAMSON.
DYNAMO ELECTRIC MACHINE.
APPLICATION FILED OCT. 5, 1908.
1,121,545.
Patented Dec. 15, 1914.
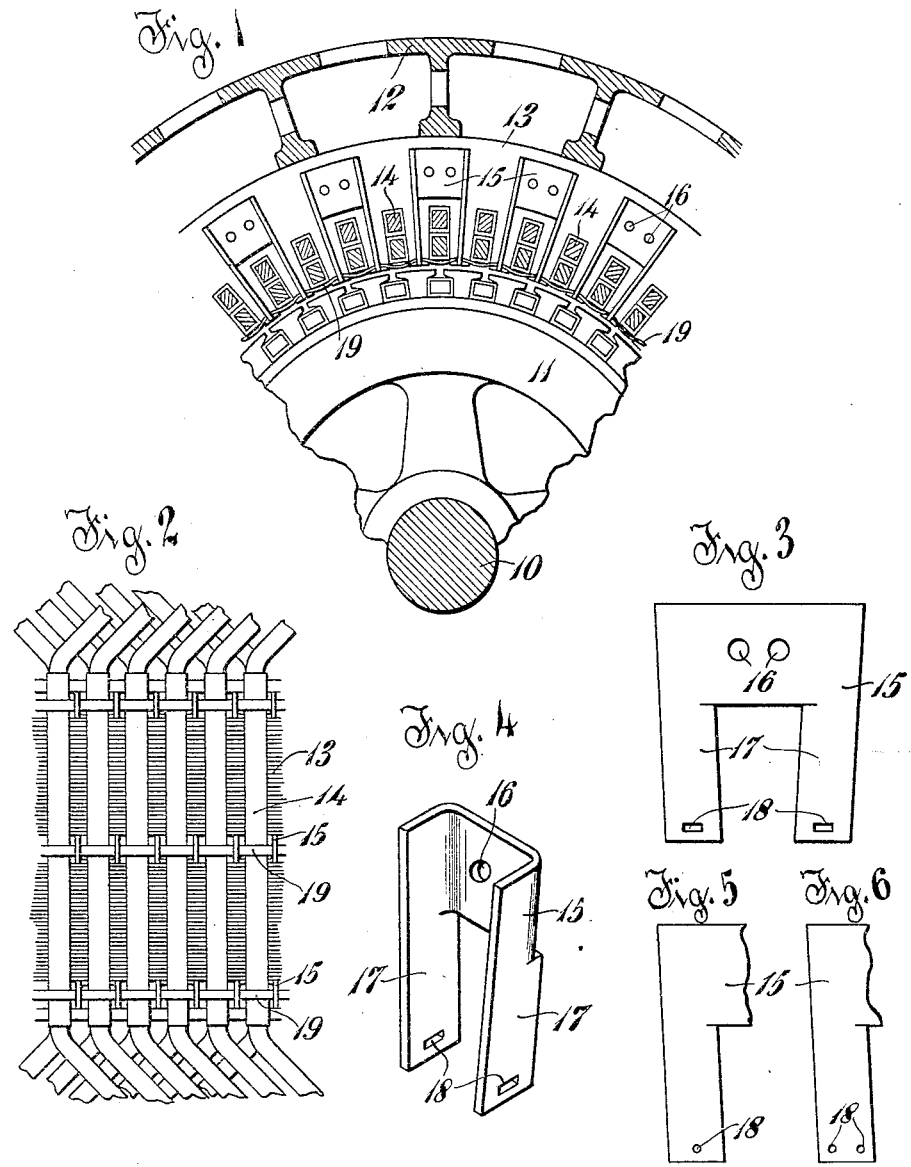

UNITED STATES PATENT OFFICE.

ROBERT B. WILLIAMSON, OF MILWAUKEE, WISCONSIN, ASSIGNOR, BY MESNE ASSIGN-
MENTS, TO ALLIS-CHALMERS MANUFACTURING COMPANY, A CORPORATION OF
DELAWARE.

DYNAMO-ELECTRIC MACHINE.

1,121,545. Specification of Letters Patent. Patented Dec. 15, 1914.

Application filed October 5, 1908. Serial No. 456,120.

*To all whom it may concern:*

Be it known that I, ROBERT B. WILLIAMSON, a citizen of the United States, residing at Milwaukee, in the county of Milwaukee and State of Wisconsin, have invented certain new and useful Improvements in Dynamo-Electric Machines, of which the following is a full, clear, and exact specification.

My invention relates to the method of and means for holding the conductors of dynamo-electric machines in their proper positions, and is particularly applicable for holding stator coils in place.

It is the object of my invention to provide a way of fastening in place the conductors of dynamo-electric machines, and especially the coils of the stator windings, which is cheaper and simpler than any heretofore used.

It may be said to consist briefly in passing a retaining band, such as a wire or strip, over the free surfaces of the conductors and through holes in the projecting ends of the ventilating spacers between the parts of the core.

The various novel features of my invention will appear from the description and drawing and will be particularly pointed out in the claims.

Figure 1 is a transverse vertical sectional view through a portion of a dynamo-electric machine in which the stator coils are held in place in accordance with my invention; Fig. 2 shows the development of a fragment of the stator, looking from the inside; Fig. 3 shows the form of punching from which the ventilating segments are formed; Fig. 4 is an isometric view of a finished ventilating segment; and Figs. 5 and 6 show fragments of ventilating segments arranged to receive a wire or wires in place of the strip which is used with the segments of Figs. 3 and 4.

On the shaft 10 is mounted the rotor 11, which may be of any desired type, but is here shown as the rotor of an induction motor of the squirrel cage type. The stator frame 12 supports the stator core 13, which is preferably laminated as indicated in Fig. 2. The laminæ are slotted to receive the stator windings 14. The laminæ of the core are arranged in groups for the purpose of ventilation, and the groups are spaced apart by ventilating segments 15. These ventilating segments are formed from punchings of the shape shown in Fig. 3, which are bent into the shape shown in Fig. 4, and riveted through the holes 16 to the adjacent laminæ. The projecting legs 17 of the ventilating spacers extend between the stator windings approximately to the surface of the stator core. Holes 18 are provided near the ends of the legs 17, these holes being of any desired shape. There may be one or more holes for each leg. In Figs. 3 and 4 the holes are rectangular, while in Figs. 5 and 6 they are round; in Fig. 6 there are two holes in each leg, while in the other figures there is only one. A strip or wire 19 is passed through the holes 18 of each group of segments 15, and over the free surfaces of the stator windings, *i. e.*, between the latter and the rotor. The strips or wires 19 serve to hold the conductors 14 firmly in place against the action of gravity and of the magnetic forces developed in the operation of the machine. A similar construction can be used to hold the conductors of rotors in their proper places provided the centrifugal force developed by the rotor is not too great.

Many modifications may be made in the precise arrangement here shown and described, and all such which do not involve a departure from the spirit and scope of my invention I aim to cover in the following claims.

What I claim as new is:

1. In a dynamo-electric machine, a plurality of core plates provided with coil receiving slots, a plurality of spacing devices secured in position between adjacent core plates, each spacing device comprising a member having an opening within the periphery of said core plates, and a retaining band passing through the openings in said spacing devices for securing the coils in said slots.

2. A spacing device comprising a U-shaped member, the legs of the U being provided with extensions having openings therethrough for the reception of a coil retaining band, the axes of said openings being approximately parallel to the cross piece of the U.

3. In a dynamo-electric machine, a plurality of core plates, a plurality of U-shaped spacing devices therebetween, each spacing device comprising a body portion secured to one of said core plates and legs provided with extensions having openings therethrough within the periphery of said core plates, and a retaining band passing through the openings in said extensions.

4. In a dynamo-electric machine, a core made up of laminated plates provided adjacent one edge with alined slots for the reception of a winding, spacing devices for adjacent core plates, each comprising a body portion secured to a plate at a point remote from slotted edge thereof, a plurality of extensions from said body portion disposed on opposite sides of a slot in said plate, said extensions having approximately circumferentially-alined openings, and a retaining band passing through said openings for securing said winding in said slots.

5. In a dynamo-electric machine, a core comprising a plurality of plates slotted adjacent one edge for the reception of a winding, spacing devices between said plates, said spacing devices being provided with openings within the periphery of said plates and adjacent the slotted portion thereof, and a retaining band passing through said slot for securing said winding in place in said core.

In testimony whereof I affix my signature, in the presence of two witnesses.

ROBERT B. WILLIAMSON.

Witnesses:
H. C. CASE,
CHAS. L. BYRON.

Copies of this patent may be obtained for five cents each, by addressing the "Commissioner of Patents, Washington, D. C."